(12) United States Patent
Ghosh et al.

(10) Patent No.: US 12,156,265 B2
(45) Date of Patent: Nov. 26, 2024

(54) REDUCED NEIGHBOR REPORT (RNR) ELEMENT FOR MULTI-LINK DEVICES (MLD) AND MULTIPLE BSSIDS FOR COHOSTED AND COLLOCATED ACCESS POINTS

(71) Applicant: Intel Corporation, Santa Clara, CA (US)

(72) Inventors: Chittabrata Ghosh, Fremont, CA (US); Laurent Cariou, Milizac (FR); Po-Kai Huang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 17/320,447

(22) Filed: May 14, 2021

(65) Prior Publication Data

US 2021/0274574 A1 Sep. 2, 2021

Related U.S. Application Data

(60) Provisional application No. 63/025,781, filed on May 15, 2020.

(51) Int. Cl.
*H04W 76/11* (2018.01)
*H04W 28/02* (2009.01)
*H04W 40/24* (2009.01)
*H04W 84/12* (2009.01)

(52) U.S. Cl.
CPC ........ *H04W 76/11* (2018.02); *H04W 28/0263* (2013.01); *H04W 40/244* (2013.01); *H04W 40/248* (2013.01); *H04W 84/12* (2013.01)

(58) Field of Classification Search
None
See application file for complete search history.

(56) References Cited

U.S. PATENT DOCUMENTS

| 2016/0219617 A1* | 7/2016 | Zhou | H04W 72/21 |
| 2021/0014911 A1* | 1/2021 | Patil | H04W 72/0446 |
| 2021/0051574 A1* | 2/2021 | Chu | H04W 84/18 |
| 2021/0120599 A1* | 4/2021 | Cariou | H04W 88/08 |
| 2021/0212150 A1* | 7/2021 | Chu | H04W 8/24 |

(Continued)

FOREIGN PATENT DOCUMENTS

EP 4145933 A1 * 3/2023 ............ H04W 48/08

*Primary Examiner* — Kenny S Lin
(74) *Attorney, Agent, or Firm* — Schwegman Lundberg & Woessner, P.A.

(57) ABSTRACT

An access point (AP) multi-link device (MLD) (AP MLD) comprises a plurality of affiliated access points (APs) including a first affiliated AP (AP1) and a second affiliated AP (AP2). When the first affiliated AP (AP1) is configured to operate as a reporting AP, the reporting AP may encode MLD information in a management frame for transmission to one or more STAs of a station MLD (STA MLD). The MLD information may include a basic service set (BSS) identifier (ID) (BSSID) of the AP1 and may include a BSSID index of at least the AP2 when the AP2 is in a multiple BSSID (MBSSID) set that does not include the BSSID of the AP1. The MLD information may further include at least one of a delivery traffic indication map (DTIM) period of the AP2. The AP1 may decode a frame from a non-AP STA of the STA MLD that includes a BSSID of the MBSSID set for association or reassociation.

15 Claims, 4 Drawing Sheets

(56) References Cited

U.S. PATENT DOCUMENTS

| | | | |
|---|---|---|---|
| 2021/0250848 A1* | 8/2021 | Seok | H04W 48/16 |
| 2021/0298102 A1* | 9/2021 | Kwon | H04W 48/08 |
| 2021/0314846 A1* | 10/2021 | Chu | H04W 40/244 |
| 2021/0337613 A1* | 10/2021 | Seok | H04W 24/02 |
| 2022/0330136 A1* | 10/2022 | Siraj | H04W 48/10 |

* cited by examiner

New MLD parameters field in the RNR:

| TBTT Information Header | Operating Class | Channel Number | TBTT Information Set |
|---|---|---|---|
| 2 | 1 | 1 | variable |

Octets:

FIG. 2

| TBTT Information Field Type | Filtered Neighbor AP | Reserved Co-Located AP | TBTT Information Count | TBTT Information Length |
|---|---|---|---|---|
| 2 | 1 | 1 | 4 | 8 |

B0  B1 B2  B3  B4  B7 B8  B15

Bits:

FIG. 3

| Neighbor AP TBTT Offset | BSSID (optional per link TBD) | Short-SSID (optional per link TBD) | BSS parameters | MLD related info |
|---|---|---|---|---|
| 1 | 0 or 6 | 0 or 4 | 1 | |

Octets:

FIG. 4

| Link ID | MLD Set ID x | ... | MLD Set ID y | MLD x MAC address | ... | MLD y MAC address | BSSID of Tx BSSID | BSSID index of non-Tx BSSID |
|---|---|---|---|---|---|---|---|---|
| TBD | TBD | TBD | TBD | TBD | TBD | TBD | TBD | TBD |

MLD related info in RNR

FIG. 5

REDUCED NEIGHBOR REPORT (RNR) ELEMENT FOR MULTI-LINK DEVICES (MLD) AND MULTIPLE BSSIDS FOR COHOSTED AND COLLOCATED ACCESS POINTS

PRIORITY CLAIM

This application claims priority under 35 U.S.C. 119(e) to U.S. Provisional Patent Application Ser. No. 63/025,781, filed May 15, 2020 which is incorporated herein by reference in its entirety.

TECHNICAL FIELD

Embodiments pertain to wireless communications. Some embodiments relate to reduced neighbor report (RNR) for multi-link device (MLD) and multiple basic service set identifications (BSSIDs) for Cohosted and Collocated access points (APs). Some embodiments relate to IEEE P802.11be and extremely-high throughput (EHT) networks.

BACKGROUND

One issue with MLDs is the discover by non-AP STAs of APs of a MLD having multiple BSSIDs. This is particularly an issue with MLDs because the APs of the MLD may not provide multiple BSSIDs information in their beacon frame transmissions.

BRIEF DESCRIPTION OF THE DRAWINGS

FIG. 2 illustrates a neighbor AP information field format in accordance with some embodiments.

FIG. 3 illustrates a target beacon transmission time (TBTT) information header subfield in accordance with some embodiments.

FIG. 4 illustrates a TBTT information field in accordance with some embodiments.

FIG. 5 illustrates MLD related information in a Reduced Neighbor Report (RNR) element in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
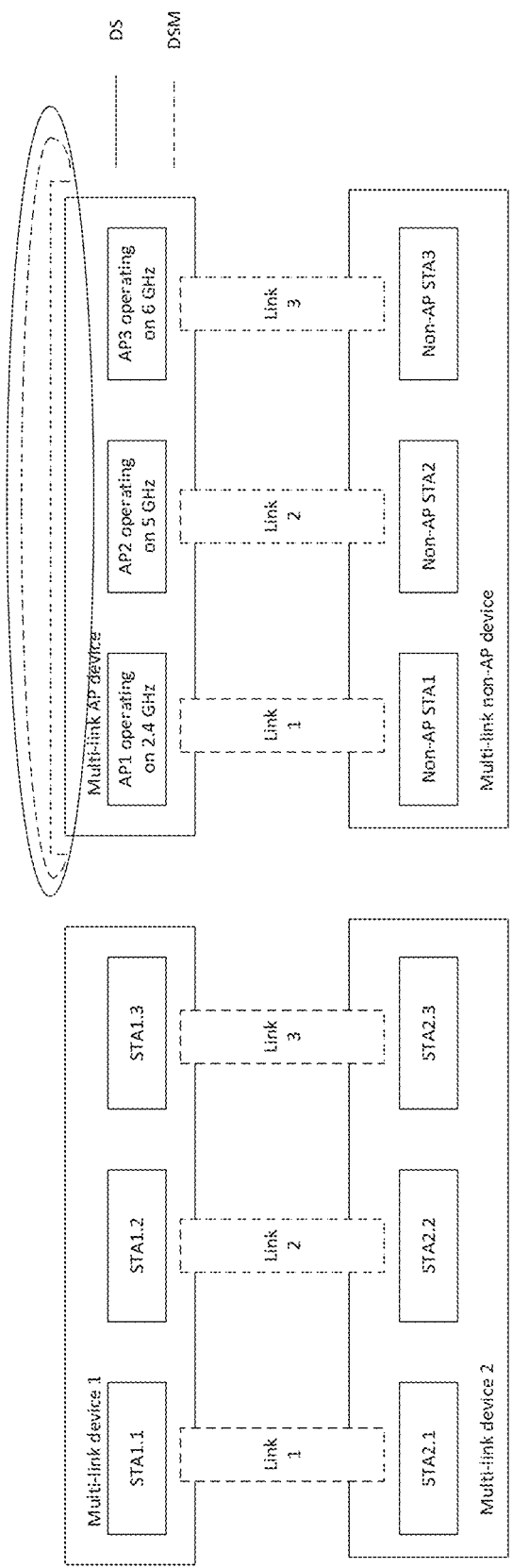
FIG. 1 illustrates a multi-link framework in accordance with some embodiments.

FIG. 1 illustrates a multi-link framework in accordance with some embodiments. Embodiments are directed to an access point (AP) multi-link device (MLD) (AP MLD) comprising a plurality of affiliated access points (APs) including a first affiliated AP (AP1) and a second affiliated AP (AP2). In these embodiments, when the first affiliated AP (AP1) is configured to operate as a reporting AP, the reporting AP may be configured to encode MLD information in a management frame for transmission to one or more STAs of a station MLD (STA MLD). In these embodiments, the MLD information may include a basic service set (BSS) identifier (ID) (BSSID) of the AP1 and may include a BSSID index of at least the AP2 when the AP2 is in a multiple BSSID (MBSSID) set that does not include the BSSID of the AP1. In these embodiments, the MLD information may further include at least one of a delivery traffic indication map (DTIM) period of the AP2. In these embodiments, the AP1 may decode a frame from a non-AP STA of the STA MLD, the frame including a BSSID of the MBSSID set. Accordingly, a non-AP STA may be able to discover a non-transmitted BSSID profile (i.e., based on a BSSID in the MBSSID set), although the scope of the embodiments is not limited in this respect.

In some embodiments, the frame received from the non-AP STA of the STA MLD may be an association or reassociation request frame indicating that the non-AP STA is requesting to associate with one of the affiliated APs of the AP MLD in the MBSSID set other than the AP1, although the scope of the embodiments is not limited in this respect.

In some embodiments, the MLD information may further include at least one of a DTIM offset of the AP2 and a target beacon transmission time (TBTT) offset indicating a next DTIM beacon, although the scope of the embodiments is not limited in this respect.

In some embodiments, the MLD information may further include a MaxBSSIDIndicator of the multiple BSSID set that includes the AP2, although the scope of the embodiments is not limited in this respect.

In some embodiments, the AP1 may encode the MLD information in a Reduced Neighbor Report (RNR) element, although the scope of the embodiments is not limited in this respect. In some embodiments, the AP1 may encode the MLD information in a Multiple BSSID-Index element, although the scope of the embodiments is not limited in this respect. In some embodiments, the AP1 may encode the MLD information in either a Multiple BSSID-Index element or and RNR element in a management frame comprising a beacon frame, although the scope of the embodiments is not limited in this respect. In some embodiments, the AP1 may encode the MLD information in either a Multiple BSSID-Index element or and RNR element in a management frame comprising one of a Probe Response and Re(Association) Response frame, although the scope of the embodiments is not limited in this respect.

In some embodiments, the management frame may be a multi-link association setup request frame that is part of a multi-link setup process. In these embodiments, the AP MLD is a logical entity comprising the plurality of affiliated APs. In these embodiments, the AP MLD may be configured to use a single MAC address for transmission of MAC service data units (MSDUs) across multiple links established with the STA MLD, although the scope of the embodiments is not limited in this respect.

In some embodiments, the affiliated APs comprise extremely high throughput (EHT) AP STAs. In these embodiments, the STAs of the STA MLD may comprise EHT non-AP STAs. In these embodiments, the affiliated APs of the AP MLD may be co-located, although the scope of the embodiments is not limited in this respect.

Some embodiments are directed to a non-transitory computer-readable storage medium that stores instructions for execution by processing circuitry of an access point (AP) multi-link device (MLD) (AP MLD), the AP MLD comprising a plurality of affiliated access points (APs) including a first affiliated AP (AP1) and a second affiliated AP (AP2). In these embodiments, when the first affiliated AP (AP1) is configured to operate as a reporting AP, the processing circuitry may configure the reporting AP to encode MLD information in a management frame for transmission to one or more STAs of a station MLD (STA MLD). In these embodiments, the processing circuitry and memory may be part of any one of the affiliated APs of the AP MLD.

Some embodiments are directed to a station (STA) multi-link device (MLD) (STA MLD) comprising a plurality of affiliated non access point (AP) STAs including a first affiliated STA (STA1) and a second affiliated STA (STA2). In these embodiments, the STA1 may decode MLD information received by the STA1 in a management frame from a first affiliated AP (AP1) operating as a reporting AP of an AP MLD In these embodiments, the MLD information may include a basic service set (BSS) identifier (ID) (BSSID) of the AP1 and may include a BSSID index of at least the AP2 when the AP2 is in a multiple BSSID (MBSSID) set that does not include the BSSID of the AP1. In these embodiments, the MLD information may further include at least one of a delivery traffic indication map (DTIM) period of the AP2. In these embodiments, the STA1 may encode a frame for transmission that includes a BSSID of the MBSSID set.

In some of these embodiments, the frame encoded for transmission by the STA1 of the STA MLD may be an association or reassociation request frame indicating that the STA1 is requesting to associate with one of the affiliated APs of the AP MLD in the MBSSID set other than the AP1, although the scope of the embodiments is not limited in this respect.

As illustrated in FIG. 1, there are two multi-link devices on either side which includes multiple STAs that can setup link with each other.

Multi-link device (MLD): A device that has more than one affiliated STA and has one MAC SAP to LLC, which includes one MAC data service.

NOTE 1—The device can be logical.

For infrastructure framework, there is a Multi-link AP device, which includes APs on one side, and Multi-link non-AP device, which includes non-APs on the other side. The detailed definition is shown below.

AP multi-link device (AP MLD): A MLD, where each STA affiliated with the MLD is an AP.

Non-AP multi-link device (non-AP MLD): A MLD, where each STA affiliated with the MLD is a non-AP STA.

Note that this framework is a natural extension from the one link operation between two STAs, which are AP and non-AP STA under infrastructure framework.

There is a need to define ways for a non-AP STA to discover an AP MLD. As the AP MLD is made of multiple APs operating on different bands, each AP of the AP MLD will be sending a beacon frame that includes:

a description of its capabilities, operation elements,
a basic description of the other AP of the same MLD that are collocated: can be a report in a Reduced Neighbor Report element.

In some rare cases, the description of the other APs could be complete and include all the capabilities, operation elements of the other APs.

After the discovery process, after association, a non-AP MLD should be aware of the following information of the AP MLD:

If the AP MLD to which it is associated also supports virtual APs belonging to a specific MBSSID set
If the AP MLD to which it is associated is the transmitted BSSID
If the AP MLD is within a MBSSID set but not the transmitted BSSID, in that case it should have information of the transmitted BSSID
If the AP MLD is co-hosted with another affiliated AP in the same link
If the AP MLD is collocated with another affiliated AP over different links The basic discovery information will be provided in the RNR in the beacons/probes of an AP and, there is a need to mandate that each AP that is collocated and part of the same MLD as the AP sending the beacon/probe shall be reported in the RNR, with a clear indication that the AP is part of the same MLD as the reporting AP. Additional information about virtual APs might be indicated either in the Multi-BSSID element or in the ML element carried in management frames.

In this disclosure, the affiliated AP within an AP MLD it is referred to as a "reporting" AP that transmits either a Beacon frame or other management frame to indicate information of its MLD and the corresponding MBSSID set or identifiers. There are several occasions where providing information either in ML element or in Multi-BSSID element might not be adequate. In the absence of the information (proposed in this disclosure) provided by the reporting AP, it would be difficult for STAs associated to this reporting AP to either ignore or respect the Beacon or other management frames from any transmitted BSSID or other MLDs within the same physical AP MLD.

Case I: If an affiliated (or reporting) AP in an AP MLD is not part of the MBSSID set, then it will not include the Multi-BSSID element. Hence, this disclosure illustrates the procedure for the reporting AP of conveying information of a transmitted BSSID to a non-AP MLD in such a case.

Case II: An affiliated (reporting) AP might be part of an MBSSID set; however, it might be serving as a non-transmitted BSSID, where in another affiliated AP of another AP MLD in the same BSSID set serves as a transmitted BSSID. In this case, the affiliated AP does not transmit Beacon frame. In this case, in this disclosure, a procedure is defined for the reporting AP of conveying information about the corresponding AP MLD and the transmitted BSSID.

Case III: The affiliated (reporting) AP is co-hosted with another affiliated AP in an AP MLD, while it is not collocated with another affiliated AP of another AP MLD. In this disclosure, a procedure is defined for conveying information in the Beacon frame about the collocated APs.

Example embodiments of the present disclosure relate to systems, methods, and devices for RNR for MLD and multiple BSSIDs for Cohosted and Collocated APs.

In one embodiment, a RNR for MLD system may facilitate a plurality of cases.

For Case 1, a RNR for MLD system may facilitate that the reporting AP includes the following information in the ML element:

(i) the BSSID of the transmitted BSSID and
(ii) BSSID index of the non-transmitted BSSIDs or MaxBSSID Indicator.

When an affiliated STA in a non-AP MLD that is associated to the reporting AP, the information above will assist the STA to ignore management or control frames received from non-transmitted AP.

For Case 2, a RNR for MLD system may define an MLD identifier (ID) that will identify the subset of affiliated APs that are part of the MLD ID.

For Case 3, a RNR for MLD system may define a collocated set ID and a cohosted set ID. As applicable, these identifiers are proposed to be included in the RNR and the corresponding BSSID of APs either in the unique collocated set ID or a unique (distinct from collocated set ID) cohosted set ID.

Embodiments disclosed herein may allow the discovery of all APs that are part of the same MLD as multiple BSSIDs in a multiple BSSID set.

Consider the following case: an AP, say AP 1, is an affiliated AP of an MLD. AP 1 may or may not be in a multiple BSSID set. AP 1 needs to report information of other affiliated APs of the same MLD. One of other affiliated APs, say AP 2, is in a multiple BSSID set.

In one or more embodiments, a RNR for MLD system may include at least one or more of the following values/fields in either the RNR or ML element within a management frame (e.g., Beacon, Probe Response, Re(Association) Response) transmitted by AP1.

BSSID of the transmitted BSSID of the multiple BSSID set that includes AP2.
MaxBSSIDIndicator of the multiple BSSID set that includes AP2 as defined in multiple BSSID element.
BSSID-index of AP2 as defined in Multiple BSSID-Index element.
DTIM period AP 2 as defined in Multiple BSSID-Index element.
One of the following metric:
DTIM offset of AP2. DTIM Offset indicates the difference of
Beacon interval between the first DTIM Beacon of AP2 with TBTT larger than or equal to TSF 0 of transmitted BSSID of the multiple BSSID set and TSF 0 of transmitted BSSID of the multiple BSSID set. TSF Offset between the current AP (AP 1) and AP 2.
DTIM Offset of AP 2. DTIM Offset indicates the difference of Beacon interval between the next DTIM Beacon of AP2 and Beacon indicated by TBTT Offset field (in this case, TSF Offset is assumed to be unknown).
TBTT Offset indicating the next DTIM Beacon.

The information could be carried either in the RNR or in the ML element within the management frame.

FIG. 2 illustrates a neighbor AP information field format in accordance with some embodiments.

FIG. 3 illustrates a target beacon transmission time (TBTT) information header subfield in accordance with some embodiments.

FIG. 4 illustrates a TBTT information field in accordance with some embodiments.

FIG. 5 illustrates MLD related information in a Reduced Neighbor Report (RNR) element in accordance with some embodiments.

Case I: Affiliated AP in AP MLD not part of MBSSID Set
Within a physical AP MLD device, there might be a subset of affiliated APs that may not be a part of an MBSSID set. However, a subset of other affiliated APs may support virtual APs within its MBSSID set.

In one or more embodiments, a RNR for MLD system may include at least one or more of the following values/fields in either the RNR or ML element within a management frame (e.g., Beacon) transmitted by the reporting or affiliated AP:

the link identifier that identifies operation on a specific link by the affiliated AP.
MLD set ID that identifies the subset of affiliated APs in different links constituting the physical or logical AP MLD.
Other MLD set IDs that identifies subset of affiliated APs from different AP MLDs within the same physical AP MLD.
Different AP MLD MAC addresses.
If any other affiliated AP, say AP 1, (but not this affiliated AP that sends the frame) in the same MLD that includes the supports MBSSID, then the affiliated AP that sends the frame shall include the following for AP1:
BSSID of the transmitted BSSID of the multiple BSSID set, which includes the
BSSID index of non-transmitted BSSIDs operating in the same link as that of the transmitted BSSID.
TBTT.
DTIM Offset, DTIM Count, and/or DTIM Interval.
DTIM TBTT.

Case II: Affiliated AP in AP MLD and is a non-transmitted BSSID:
In one or more embodiments, a RNR for MLD system may facilitate that the affiliated (reporting) AP can include at least one of the following information in the MBSSID element or ML element within or external to the MBSSID element:
MLD Set ID that the affiliated AP is part of.
Other MLD Set IDs part of the physical AP MLD.
Cohosted Set ID if the affiliated AP is part of and mapped to the MBSSID Set it constitutes.
Collocated Set ID if the affiliated AP is part of and mapped to the MBSSID Set it constitutes.

It should be noted that the Collocated Set ID and Cohosted Set IDs are unique at least when transmitted within the same frame or could be drawn from unique non-overlapping ranges Case III: Affiliated AP in AP MLD co-hosted with another affiliated AP but not collocated with another affiliated AP:
In this case, we propose that the affiliated (reporting) AP can include at least one of the following information in the RNR (Reduced Neighbor Report) within a management frame:
Report every AP individually; Collocated set ID.
Report MBSSID set ID and MBSSID index if it is a Non-transmitted BSSID.
Cohosted set ID on the operating link.
BSSID of affiliated AP that is collocated within physical AP MLD.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties.

Figure 6:
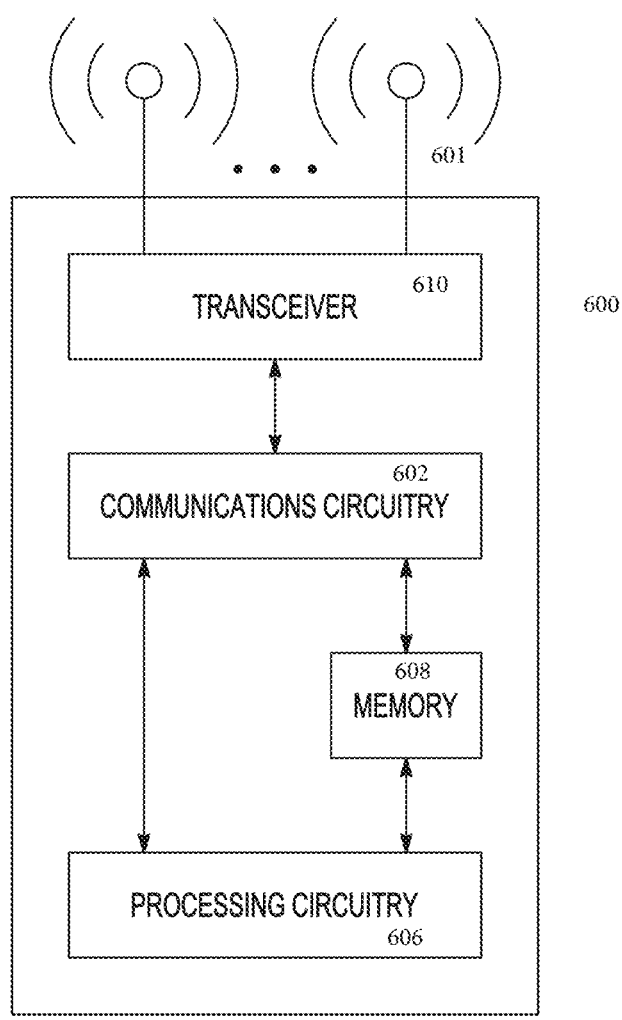
FIG. 6 is a functional block diagram of a wireless communication station (STA) in accordance with some embodiments.

In one embodiment, FIG. 6 illustrates a functional block diagram of a communication station (STA) that may be suitable for use as an AP STA, a non-AP STA or other user device in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

EXAMPLES

Example 1 may include a device comprising processing circuitry coupled to storage, the processing circuitry configured to: determine a frame comprising multi-link device (MLD) related information; and cause to send the frame to a first station device of one or more station devices.

Example 2 may include the device of example 1 and/or some other example herein, wherein the frame may be a beacon frame, a probe response frame, or a re-association response frame.

Example 3 may include the device of example 1 and/or some other example herein, wherein the MLD related information comprises a link ID, one or more MLD set IDs, one or more MLD MAC addresses, a BSSID of a transmitter BSSID, and a BSSID index of a non-transmit BSSID.

Example 4 may include the device of example 1 and/or some other example herein, further comprising a transceiver configured to transmit and receive wireless signals.

Example 5 may include the device of example 4 and/or some other example herein, further comprising an antenna coupled to the transceiver to cause to send the frame.

Example 6 may include a non-transitory computer-readable medium storing computer-executable instructions which when executed by one or more processors result in performing operations comprising: determining a frame comprising multi-link device (MLD) related information; and causing to send the frame to a first station device of one or more station devices.

Example 7 may include the non-transitory computer-readable medium of example 6 and/or some other example herein, wherein the frame may be a beacon frame, a probe response frame, or a re-association response frame.

Example 8 may include the non-transitory computer-readable medium of example 6 and/or some other example herein, wherein the MLD related information comprises a link ID, one or more MLD set IDs, one or more MLD MAC addresses, a BSSID of a transmitter BSSID, and a BSSID index of a non-transmit BSSID.

Example 9 may include a method comprising: determining, by one or more processors, a frame comprising multi-link device (MLD) related information; and causing to send the frame to a first station device of one or more station devices.

Example 10 may include the method of example 9 and/or some other example herein, wherein the frame may be a beacon frame, a probe response frame, or a re-association response frame.

Example 11 may include the method of example 9 and/or some other example herein, wherein the MLD related information comprises a link ID, one or more MLD set IDs, one or more MLD MAC addresses, a BSSID of a transmitter BSSID, and a BSSID index of a non-transmit BSSID.

Example 12 may include an apparatus comprising means for: determining a frame comprising multi-link device (MLD) related information; and causing to send the frame to a first station device of one or more station devices.

Example 13 may include the apparatus of example 12 and/or some other example herein, wherein the frame may be a beacon frame, a probe response frame, or a re-association response frame.

Example 14 may include the apparatus of example 12 and/or some other example herein, wherein the MLD related information comprises a link ID, one or more MLD set IDs, one or more MLD MAC addresses, a BSSID of a transmitter BSSID, and a BSSID index of a non-transmit BSSID.

Example 15 may include one or more non-transitory computer-readable media comprising instructions to cause an electronic device, upon execution of the instructions by one or more processors of the electronic device, to perform one or more elements of a method described in or related to any of examples 1-14, or any other method or process described herein.

Example 16 may include an apparatus comprising logic, modules, and/or circuitry to perform one or more elements of a method described in or related to any of examples 1-14, or any other method or process described herein.

Example 17 may include a method, technique, or process as described in or related to any of examples 1-14, or portions or parts thereof.

Example 18 may include an apparatus comprising: one or more processors and one or more computer readable media comprising instructions that, when executed by the one or more processors, cause the one or more processors to perform the method, techniques, or process as described in or related to any of examples 1-14, or portions thereof.

Example 19 may include a method of communicating in a wireless network as shown and described herein.

Example 20 may include a system for providing wireless communication as shown and described herein.

Example 21 may include a device for providing wireless communication as shown and described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an access point (AP) multi-link device (MLD) (AP MLD), the AP MLD comprising a plurality of affiliated access points (APs) including a first affiliated AP (AP1) and a second affiliated AP (AP2), the apparatus comprising: processing circuitry; and memory,
    wherein when the first affiliated AP (AP1) is configured to operate as a reporting AP, the reporting AP corresponding to a transmitted basic service set (BSS) identifier (ID) (BSSID) in a multiple BSSID set, the processing circuitry is to configure the reporting AP to:
    encode a management frame for transmission to include a Reduced Neighbor Report Element with a Neighbor AP Information field, the management frame using the transmitted BSSID of the BSSID set,
    wherein the Neighbor AP Information field comprises MLD information to identify a reported AP and includes a target beacon transmission time (TBTT) information field,
    wherein the processing circuitry is configured to:
    when the reported AP is affiliated with a MLD having a non-transmitted BSSID of the multiple BSSID set, encode the MLD information of the Neighbor AP Information field to indicate the non-transmitted BSSID; and
    when the reported AP is affiliated with another AP MLD that is not the AP MLD with which the reporting AP is affiliated and is not the AP MLD having the non-transmitted BSSID of the multiple BSSID set, encode the MLD information to include one or more predetermined values,
    wherein the TBTT information field includes a TBTT offset indicating a difference between target beacon transmission times of the reported AP and the reporting AP.

2. The apparatus of claim 1, wherein the processing circuitry is further configured to decode an association request frame from a non-AP STA of a STA MLD, the association request frame indicating that the non-AP STA is requesting to associate with one of the affiliated APs of the AP MLD in the multiple BSSID set other than the reporting AP, the one of the affiliated APs indicated in a BSSID of the multiple BSSID set included in the association request frame.

3. The apparatus of claim 1, wherein the management frame is one of the beacon frame and a Probe Response frame.

4. The apparatus of claim 3, wherein the management frame further includes a delivery traffic indication map (DTIM) period for the reported AP.

5. The apparatus of claim 4, wherein a multiple BSSID Index element used to include the non-transmitted BSSID includes a MaxBSSID indicator of the multiple BSSID set.

6. The apparatus of claim 5, wherein the AP MLD is a logical entity comprising a plurality of affiliated APs including the AP1 and the AP2, the AP MLD configured to use a single MAC data service and service access point to logical link control (LLC) sublayer.

7. The apparatus of claim 6, wherein the processing circuitry is to configure the AP MLD to perform a multi-link setup process to establish multiple links between the AP MLD and a non-AP MLD having a plurality of affiliated non-AP STAs.

8. The apparatus of claim 1, wherein the AP2 is the reported AP.

9. A non-transitory computer-readable storage medium that stores instructions for execution by processing circuitry of an access point (AP) multi-link device (MLD) (AP MLD), the AP MLD comprising a plurality of affiliated access points (APs) including a first affiliated AP (AP1) and a second affiliated AP (AP2), wherein when the first affiliated AP (AP1) is configured to operate as a reporting AP, the reporting AP corresponding to a transmitted basic service set (BSS) identifier (ID) (BSSID) in a multiple BSSID set, the processing circuitry is to configure the reporting AP to:
    encode a management frame for transmission to include a Reduced Neighbor Report Element with a Neighbor AP Information field, the management frame using the transmitted BSSID of the BSSID set,
    wherein the Neighbor AP Information field comprises MLD information to identify a reported AP and includes a target beacon transmission time (TBTT) information field,
    wherein the processing circuitry is configured to:
    when the reported AP is affiliated with a MLD having a non-transmitted BSSID of the multiple BSSID set, encode the MLD information of the Neighbor AP Information field to indicate the non-transmitted BSSID; and when the reported AP is affiliated with another AP MLD that is not the AP MLD with which the reporting AP is affiliated and is not the AP MLD having the non-transmitted BSSID of the multiple BSSID set, encode the MLD information to include one or more predetermined values, wherein the TBTT information field includes a TBTT offset indicating a difference between target beacon transmission times of the reported AP and the reporting AP.

10. The non-transitory computer-readable storage medium of claim 9, wherein the processing circuitry is further configured to decode an association request frame from a non-AP STA of a STA MLD, the association request frame indicating that the non-AP STA is requesting to associate with one of the affiliated APs of the AP MLD in the multiple BSSID set other than the reporting AP, the one of the affiliated APs indicated in a BSSID of the multiple BSSID set included in the association request frame.

11. The non-transitory computer-readable storage medium of claim 9, wherein the management frame is one of the beacon frame and a Probe Response frame.

12. The non-transitory computer-readable storage medium of claim 11, wherein the management frame further includes a delivery traffic indication map (DTIM) period for the reported AP.

13. The non-transitory computer-readable storage medium of claim 12, wherein a multiple BSSID Index element used to include the non-transmitted BSSID includes a MaxBSSID indicator of the multiple BSSID set.

14. The non-transitory computer-readable storage medium of claim 13, wherein the AP MLD is a logical entity comprising a plurality of affiliated APs including the AP1 and the AP2, the AP MLD configured to use a single MAC data service and service access point to logical link control (LLC) sublayer.

15. A method performed by processing circuitry of an access point (AP) multi-link device (MLD) (AP MLD), the AP MLD comprising a plurality of affiliated access points (APs) including a first affiliated AP (AP1) and a second affiliated AP (AP2), wherein when the first affiliated AP (AP1) is configured to operate as a reporting AP, the reporting AP corresponding to a transmitted basic service set (BSS) identifier (ID) (BSSID) in a multiple BSSID set, the method comprises:

encoding a management frame for transmission to include a Reduced Neighbor Report Element with a Neighbor AP Information field, the management frame using the transmitted BSSID of the BSSID set, wherein the Neighbor AP Information field comprises MLD information to identify a reported AP and includes a target beacon transmission time (TBTT) information field, wherein the method further comprises:

when the reported AP is affiliated with a MLD having a non-transmitted BSSID of the multiple BSSID set, encode the MLD information of the Neighbor AP Information field to indicate the non-transmitted BSSID; and when the reported AP is affiliated with another AP MLD that is not the AP MLD with which the reporting AP is affiliated and is not the AP MLD having the non-transmitted BSSID of the multiple BSSID set, encoding the MLD information to include one or more predetermined values, and wherein the TBTT information field includes a TBTT offset indicating a difference between target beacon transmission times of the reported AP and the reporting AP.

* * * * *